July 1, 1958     W. A. VERLANDER     2,840,851
SHRIMP DEVEINER
Filed March 14, 1957
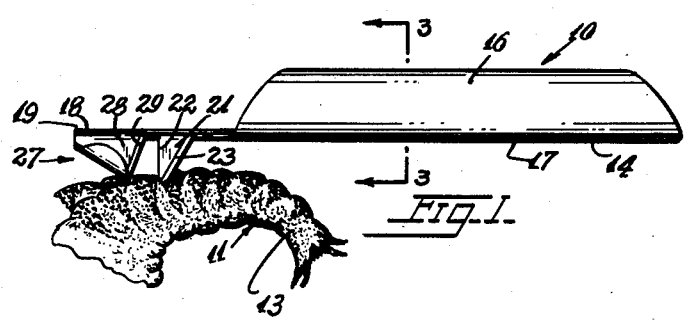
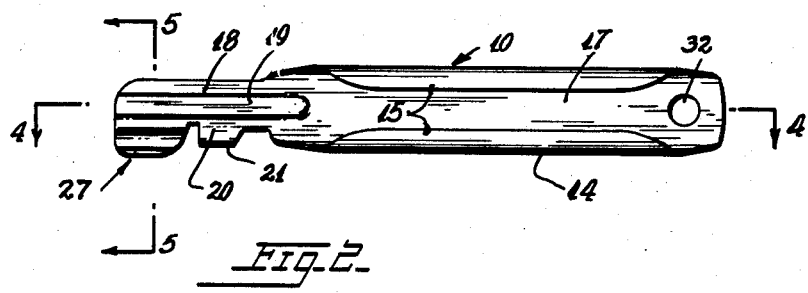
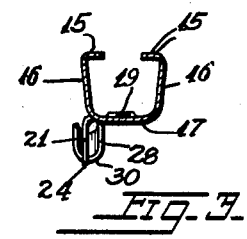
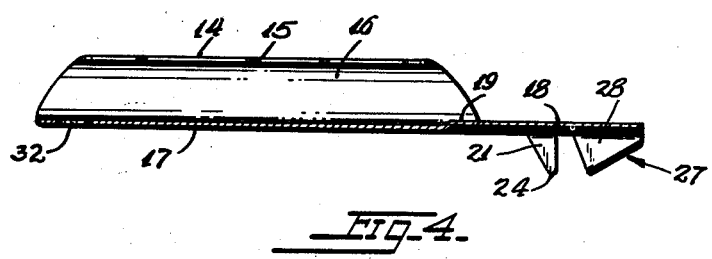
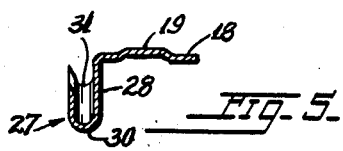
INVENTOR.
WALLACE A. VERLANDER
BY
ATTORNEY United States Patent Office 2,840,851
Patented July 1, 1958

2,840,851

SHRIMP DEVEINER

Wallace A. Verlander, Flushing, N. Y.

Application March 14, 1957, Serial No. 646,153

6 Claims. (Cl. 17—7)

This invention relates to the art of preparing shrimp for the market and, more particularly, to an implement or tool for removing the sand vein from the shrimp or for deveining the shrimp, as it is called. This is a continuation in part of my previous patent application, Serial No. 544,720, filed on November 3, 1955, and now abandoned.

In preparing shrimp for the market the shrimp is first deheaded and then the sand vein which is embedded in the flesh of the shrimp along the crest side or back of the body of the shrimp, together with the waste matter unfit for human consumption found therein, is removed. Heretofore this operation of removing the sand vein has been a tedious and a time-consuming task.

It is, therefore, a principal object of the present invention to provide an implement or tool that will quickly, easily and effectively remove the sand vein and waste matter from the shrimp.

Another object of the invention is to provide a tool of this type that will remove the sand vein and waste matter in a single operation.

A further object is to provide a tool of this type with a knife edge for cutting the back of the body of the shrimp and with a scoop trailing the knife edge for scooping up the sand vein and waste matter therein in a single operation.

It is further proposed to provide a shrimp cleaner formed of one piece of material and which has no moving parts to get out of order and which can easily be used by an unskilled person.

Yet another object of the invention is to provide a shrimp cleaner that is simple in construction and which can be manufactured and sold at a reasonable cost.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a side view of a shrimp cleaner embodying my invention, a cleaner being shown in operative position adjacent the back of a shrimp.

Fig. 2 is a top plan view of the cleaner.

Fig. 3 is a vertical sectional view taken on the plane of the line 3—3 of Fig. 1.

Fig. 4 is a longitudinal sectional view taken on the plane of the line 4—4 of Fig. 2.

Fig. 5 is a vertical sectional view taken on the plane of the line 5—5 of Fig. 2.

The implement or tool constituting the shrimp cleaner of the invention is indicated generally at 10. In Fig. 1, the cleaner is shown in position preparatory to cutting along the crest or back of the body of a shrimp 11 and preparatory to scooping out the sand vein embedded in the flesh of the shrimp along the crest or back of the body of the shrimp underneath the hard outer shell 13.

The implement or tool is made of a single piece of sheet metal and comprises an elongated handle portion 14, channel-shaped in cross section, with inturned opposed flanges 15 along the top ends of the side walls 16 thereof as viewed in Fig. 1 to strengthen the tool. At one end of the handle portion, the bottom wall 17 thereof is formed with an extension 18, in the plane of the flat bottom wall of the handle portion, constituting a continuation of the handle portion. Along its center, the extension 18 is indented as indicated at 19 in order to make the extension more rigid. Along one of the long edges of the extension, adjacent the end of the handle portion, the material of the extension extends laterally as indicated at 20 and is then turned downwardly at right angles to the lateral extension 20 forming a knife 21. The knife 21 is formed with a straight edge 22 extending at right angles to the plane of the extensions 18 and 20 and with a slanting edge 23 thereby forming a substantially triangular-shaped knife with a pointed end 24. The slanting edge 23 is the edge nearest the end of the handle portion and is formed with a knife edge leading from the pointed end 24 to the extension 20.

Along the same long edge of the extension 18 and closely spaced outwardly from the knife 21, at the extreme end of the extension there is a scoop device 27. The scoop device is formed by bending the material of the extension downwardly at right angles to the plane of the extension forming a wall portion 28 substantially triangular or wedge-shaped, with the apex of the triangle being positioned at the outer end of the extension 20. The wall portion 28 is disposed in the plane offset inwardly of the plane of the body of the knife 21, as shown in Fig. 3, and the base of the wall portion 28 slants in the same direction as the knife edge 23 of knife 21 and is formed with a knife edge 29. The free end of the wall portion 28 forming one long edge of the triangle is bent and curved outwardly and laterally as indicated at 30 (Fig. 5) thereby defining a trough 31 substantially U-shaped in cross section. The knife edges 23 and 29 on the knife and scoop, respectively, are formed on the outside edges of the knife and scoop. The trough 31 extends downwardly from the outer end of the extension 18 and inwardly toward the knife 21, with its lowermost end aligned with the pointed end 24 of the knife.

The implement or tool may be provided with an opening 32 in the handle portion 14, at its end opposite the extension 18, for hanging the implement up on a nail or the like projecting from a supporting surface.

In using the improved shrimp cleaner, the deheaded body of the shrimp 11, which is normally arcuate in shape, and which is preshelled and either raw or cooked, is grasped in the palm of the hand of the operator with the crest or back of the body of the shrimp uppermost, and the body of the shrimp is simultaneously straightened out by the operator's hand. The implement or tool 10 is grasped by the other hand and the knife 21 positioned over the outer shell 13 at the crest or back of the body of the shrimp at the head or cut end thereof directly in line with the sand vein. The knife 21 is pressed through the flesh of the body into the sand vein and then drawn from the head end toward the tail of the shrimp thereby severing or rupturing the sand vein, and the flesh thereover. At the same time, the scoop device, trailing behind, is pulled into the ruptured portions and the trough 31 digs underneath the sand vein and upon continued pulling of the tool lengthwise of the body of the shrimp toward the tail the trough scoops up the sand vein and the waste matter therein, and progressively and completely removes the same, leaving a narrow and shallow channel-shaped groove cut in the flesh of the body of the shrimp by the knife edges 23 and 29. This groove may then be cleaned by washing.

While I have illustrated and described the preferred embodiment of my invention, it is to be understood that I do not limit myself to the precise construction herein disclosed and that various changes and modifications may be made within the scope of the invention as defined in the appended claims.

Having thus described my invention, what I claim as new, and desire to secure by United States Letters Patent is:

1. A one-piece metal shrimp cleaner comprising an elongated channel-shaped handle portion having a flat integral extension on one end thereof disposed in the plane of the bottom wall portion of the handle portion, a triangular-shaped knife member extending at right angles from the plane of the extension, on one long edge of said extension, adjacent the handle portion, said knife member having a slanting knife edge, and a scoop device on the same edge of the extension extending in the same direction as the knife member, said scoop device having a trough portion extending downwardly and rearwardly from the outer end of the extension toward the knife member to a point in alignment with the end of the knife member, said scoop device having a knife edge extending in the same direction as the slanting knife edge of the knife member.

2. A one-piece metal shrimp cleaner as defined in claim 1, wherein the knife edge on the scoop device is disposed in a plane offset inwardly from the plane of the knife edge on the knife member whereby a channel-shaped groove is cut in the body of the shrimp.

3. A one-piece metal shrimp cleaner comprising an elongated channel-shaped handle portion having a flat integral extension on one end thereof disposed in the plane of the bottom wall portion of the handle portion, a triangular-shaped member extending at right angles from the plane of the extension, on one long edge of said extension, adjacent the handle portion, said member having a slanting knife edge, and a scoop device on the same edge of the extension and extending in the same direction as the triangular-shaped member, said scoop device including a substantially triangular-shaped strip of metal extending from said long edge of the extension at right angles to the plane of the extension, one long edge of the strip being turned upon itself forming a trough, U-shaped in cross section, extending from the outer end of the extension downwardly and rearwardly toward the knife member to a point in alignment with the apex end of the knife member.

4. A one-piece metal shrimp cleaner as defined in claim 3, wherein the other long edge of the extension has a knife edge extending in the same direction as the knife edge of the knife member.

5. A one-piece metal shrimp cleaner comprising an elongated channel-shaped handle portion constituting bottom and side walls, the bottom wall of the handle portion being extended at one end thereof, said extension being flat and having elongated side edges, a triangular-shaped member on the extension extending at right angles to the plane of the extension, along one long edge thereof, adjacent the handle portion, in a direction opposite to the direction of extension of the side walls of the handle portion, one slanting edge of the triangular-shaped member having a knife edge, said slanting edge being the edge closest to the handle portion.

6. A one-piece metal shrimp cleaner comprising an elongated channel-shaped handle portion constituting bottom and side walls, the bottom wall of the handle portion being extended at one end thereof, said extension being flat and having elongated side edges, and a scoop device on the extension, said scoop device including a substantially triangular-shaped strip of metal extending from one long edge of the extension at right angles to the plane of the extension, in a direction opposite to the direction of extension of said side walls of the handle portion, one long edge of the strip being turned upon itself forming a trough, U-shaped in cross section, extending from the outer end of the extension downwardly and rearwardly toward the handle portion.

References Cited in the file of this patent

UNITED STATES PATENTS

| | | |
|---|---|---|
| D. 162,924 | Becherer | Apr. 17, 1951 |
| 2,549,326 | Moore | Apr. 17, 1951 |

FOREIGN PATENTS

| | | |
|---|---|---|
| 324,240 | Great Britain | Jan. 23, 1930 |
| 340,489 | Great Britain | Dec. 24, 1930 |